(12) United States Patent
Huang

(10) Patent No.: US 9,344,145 B2
(45) Date of Patent: May 17, 2016

(54) METHOD FOR TRANSCEIVING SIGNAL BASED ON INFORMATION FROM EQUALIZER OF RECEIVING UNIT AND METHOD FOR TRAINING EQUALIZER

(71) Applicant: M31 Technology Corporation, Hsinchu County (TW)

(72) Inventor: Ting-Chun Huang, Taipei (TW)

(73) Assignee: M31 Technology Corporation, Hsinchu County (TW)

( * ) Notice: Subject to any disclaimer, the term of this patent is extended or adjusted under 35 U.S.C. 154(b) by 0 days.

(21) Appl. No.: 14/703,923

(22) Filed: May 5, 2015

(65) Prior Publication Data

US 2015/0326277 A1 Nov. 12, 2015

(30) Foreign Application Priority Data

May 7, 2014 (TW) .............................. 103116192 A

(51) Int. Cl.
*H04B 3/14* (2006.01)
*H04W 52/02* (2009.01)
*H04B 15/02* (2006.01)

(52) U.S. Cl.
CPC ................ *H04B 3/143* (2013.01); *H04B 15/02* (2013.01); *H04W 52/02* (2013.01)

(58) Field of Classification Search
CPC H04L 25/03885; H04L 1/0079; H04B 3/143; H04B 3/04
See application file for complete search history.

(56) References Cited

U.S. PATENT DOCUMENTS

| | | | |
|---|---|---|---|
| 5,963,110 A * | 10/1999 | Ihara | H04L 25/03878 333/167 |
| 7,599,431 B1 * | 10/2009 | Anderson | H04L 25/03038 375/229 |
| 8,243,782 B2 | 8/2012 | Mobin et al. | |
| 8,369,470 B2 | 2/2013 | Mobin et al. | |
| 2001/0016021 A1 | 8/2001 | Chan | |
| 2006/0045176 A1 * | 3/2006 | Moughabghab et al. | 375/232 |
| 2008/0069196 A1 | 3/2008 | Choi | |
| 2008/0198913 A1 * | 8/2008 | Fan et al. | 375/232 |
| 2009/0075607 A1 | 3/2009 | Khoury | |
| 2010/0008414 A1 * | 1/2010 | Lee et al. | 375/233 |
| 2010/0046600 A1 * | 2/2010 | Zerbe et al. | 375/233 |
| 2010/0110299 A1 * | 5/2010 | Ritter et al. | 348/607 |
| 2010/0142606 A1 * | 6/2010 | Kato | 375/232 |
| 2010/0290515 A1 * | 11/2010 | Dai et al. | 375/232 |
| 2010/0329325 A1 * | 12/2010 | Mobin et al. | 375/232 |
| 2012/0133414 A1 * | 5/2012 | Zhuang | H03K 3/356113 327/333 |
| 2012/0200375 A1 * | 8/2012 | Kaviani | H04L 25/03885 333/28 R |
| 2013/0241643 A1 * | 9/2013 | Xu et al. | 330/129 |
| 2014/0023131 A1 * | 1/2014 | Sindalovsky et al. | 375/232 |
| 2014/0064352 A1 * | 3/2014 | Zhong | H04L 25/03038 375/233 |
| 2014/0225669 A1 * | 8/2014 | Zhong | H03F 3/45197 330/254 |

\* cited by examiner

*Primary Examiner* — Aristocratis Fotakis

(57) ABSTRACT

The invention provides a method for transmitting a signal to an external electronic device. The method includes obtaining a compensation value by which an equalizer compensates a signal transmitted from the external electronic device, comparing the compensation value with a set of reference values so as to obtain one or more parameters, and adjusting an output signal transmitted from a transmit unit to the external electronic device based on the one or more parameters.

20 Claims, 15 Drawing Sheets

| Peaking Level (dB) | Cable Length (m) | Swing (mV) | The difference between high-frequency and low-frequency energies (dB) |
|---|---|---|---|
| 15 | 5 | 500 | 7.5 |
| 9 | 3 | 380 | 4.5 |
| 3 | 1 | 260 | 1.5 |
| 0 | 0 | 200 | 0 |

Fig. 2

METHOD FOR TRANSCEIVING SIGNAL BASED ON INFORMATION FROM EQUALIZER OF RECEIVING UNIT AND METHOD FOR TRAINING EQUALIZER

This application claims priority to TW application No. 103116192, filed on May 7, 2014, all of which is incorporated herein by reference in its entirety.

BACKGROUND OF THE DISCLOSURE

1. Field of the Disclosure

The invention relates to a method for transmitting a signal and a device therefor, and more particularly, to a method of automatically adjusting a signal based on the length of a transmission cable propagating the signal and a device therefor.

2. Brief Description of the Related Art

The power consumption resulting from a serial link of a mobile device is desired to be controlled at a suitable value. In general, a transmitter causes high power consumption; the power consumption resulting from the transmitter is related to the length of a transmission cable. Regarding to a design of a serial link, the transmitter is designed based on the longest length of a transmission cable in order to support one of various signal transmissions via transmission cables of various lengths, such as a 1-meter, 3-meter or 5-meter transmission cable. In other words, a signal generated by the transmitter is designed to have a fixed maximum swing for supporting signal transmission via the longest length of a transmission cable so that the transmitter is ensured to support signal transmission via the longest length of the transmission cable. However, when the transmitter (especially set in a mobile device) is employed to transmit a signal to an external device via a short length of a transmission cable, unnecessary power consumption and electromagnetic interference (EMI) will be created.

SUMMARY OF THE DISCLOSURE

The invention proposes an objective to provide a method for transmitting a signal. In accordance with the method, an electronic device may automatically adjust a swing (or the amplitude) of the signal and a difference between high and low-frequency energies of the signal based on a length of a transmission cable propagating the signal so that power consumption of the electronic device and electromagnetic interference (EMI) resulting from signal transmission from the electronic device are reduced.

The invention proposes another objective to provide a method for training an equalizer of an electronic device. The method may have a monitor set without a digital-to-analog converter (DAC) such that the monitor may have a reduced area in a physical layer of the electronic device and the cost of manufacturing the electronic device may also be reduced.

In order to achieve the above objectives, the invention provides a method for signal transmission. The method includes obtaining a receiving parameter (e.g., compensation value for high-frequency energy) by which an equalizer of an electronic device compensates (e.g., weighs or equalizes) a first signal (e.g., training sequence) transmitted from an external device to the equalizer, and adjusting or weighing a second signal (e.g., differential signal in an analog form), to be sent by a transmit unit (or transmitter) of the electronic device to the external device, by transmitting parameters associated with the receiving parameter. The electronic device may be a handheld or mobile computing device (e.g., smartphone or tablet computer) having a serial bus interface (e.g., universal serial bus (USB) interface) or a hot swapping interface configured for receiving the first signal from the external device and transmitting the second signal to the external device. The external device may be another handheld or mobile computing device (e.g., another smartphone or tablet computer), a portable electronic device (e.g., USB storage device, external storage device, or projector), or another electronic device having a serial bus interface (e.g., USB interface) or a hot swapping interface configured for receiving the second signal from the electronic device and transmitting the first signal to the electronic device.

The invention provides an electronic device including an equalizer and a transmit unit (or transmitter). The equalizer is configured to receive a first signal (e.g., training sequence) transmitted from an external device and compensate, weigh or equalize the first signal by a compensation value, such as for high-frequency energy. The transmit unit is configured to adjust or weigh a second signal (e.g., differential signal in an analog form) to be transmitted to the external device by transmitting parameters associated with the compensation value. The electronic device may be a handheld or mobile computing device (e.g., smartphone or tablet computer) having a serial bus interface (e.g., USB interface) or a hot swapping interface configured for receiving the first signal from the external device and transmitting the second signal to the external device. The external device may be another handheld or mobile computing device (e.g., smartphone or tablet computer), a portable electronic device (e.g., USB storage device, external storage device, or projector), or another electronic device having a serial bus interface (e.g., USB interface) or a hot swapping interface configured for receiving the second signal from the electronic device and transmitting the first signal to the electronic device.

The invention provides a method for training an equalizer. The method includes: (1) adjusting a gain value by which an automatic gain control (AGC) unit amplifies a signal (e.g., training sequence) such that the signal is changed from having a voltage swing exceeding a reference range of two values to having no voltage swing exceeding the reference range of the two values in a unit of a fixed time period greater than or substantially equal to the time period of a packet of the signal; (2) the equalizer compensating (e.g., weighing, equalizing, or adjusting) the signal, amplified by the gain value, by a receiving parameter (e.g., compensation value for high-frequency energy) such that the signal, amplified by the gain value, has a voltage swing, such as at its high-frequency part, exceeding the reference range of the two values; and (3) adjusting the receiving parameter by which the equalizer compensates the signal, amplified by the gain value, such that the signal, amplified by the gain value, is changed from having a voltage swing, such as at its high-frequency part, exceeding the reference range of the two values to having no voltage swing, such as at its high-frequency part, exceeding the reference range of the two values in a unit of the fixed time period. The two values may be two respective voltages for linear operation for an electronic device.

The invention provides a method for training an equalizer. The method includes: (1) adjusting a gain to a first gain value by which an AGC unit amplifies an input signal (e.g., training sequence) into a first gained signal such that a processing unit detects a transition in a monitoring signal (e.g., digital signal output from a monitor), associated with the first gained signal, in a unit of a fixed time period greater than or substantially equal to the time period of a packet of the input signal; (2) adjusting the gain to a second gain value by which the AGC unit amplifies the input signal into a second gained signal such that the processing unit does not detect a transition in a monitoring signal (e.g., digital signal output from the monitor), associated with the second gained signal, in a unit of the fixed time period; (3) adjusting a compensation value to a first compensation value (e.g., the maximum compensation value for high-frequency energy) by which the equalizer compensates (e.g., equalizes or weighs) the second gained signal into a first equalized signal such that the processing unit detects a transition in a monitoring signal (e.g., digital signal output from the monitor), associated with the first equalized signal, in a unit of the fixed time period; and (4) adjusting the compensation value to a second compensation value (e.g., compensation value for high-frequency energy) by which the equalizer compensates the second gained signal into a second equalized signal such that the processing unit does not detect a transition in a monitoring signal (e.g., digital signal output from the monitor), associated with the second equalized signal, in a unit of the fixed time period. In the steps (1) and (2), the compensation value is adjusted to a third compensation value (e.g., the minimum compensation value for high-frequency energy) by which the equalizer compensates the first or second gained signal, and the third compensation value may be less than the second compensation value. The first compensation value may be greater than the second compensation value.

These, as well as other components, steps, features, benefits, and advantages of the present disclosure, will now become clear from a review of the following detailed description of illustrative embodiments, the accompanying drawings, and the claims.

BRIEF DESCRIPTION OF THE DRAWINGS

The drawings disclose illustrative embodiments of the present disclosure. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same reference number or reference indicator appears in different drawings, it may refer to the same or like components or steps.

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings:

FIG. 2 shows a set of reference values for comparison in accordance with an embodiment of the present invention;

Figure 1:
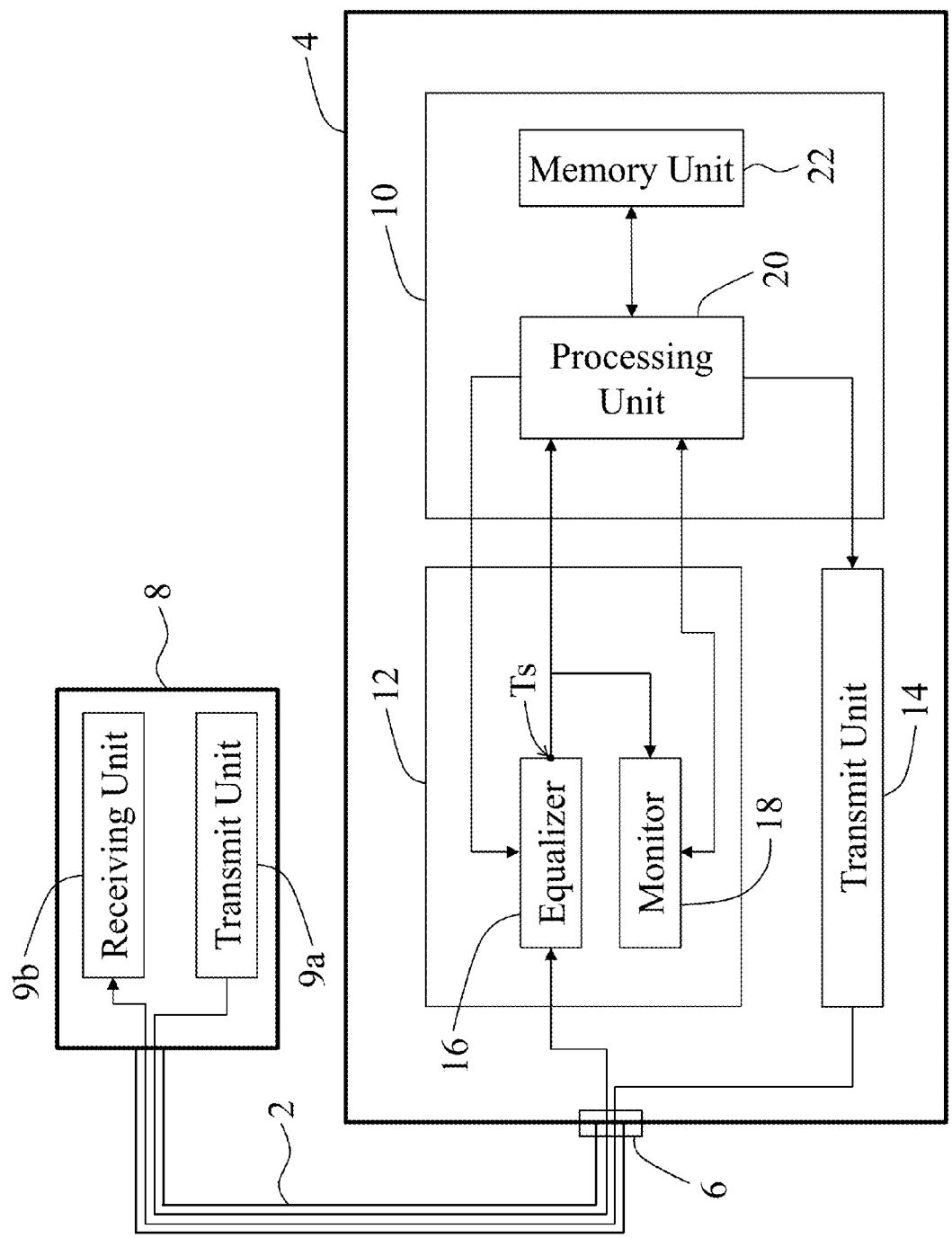
FIG. 1 is a system block diagram in accordance with a first embodiment of the present invention.

While certain embodiments are depicted in the drawings, one skilled in the art will appreciate that the embodiments depicted are illustrative and that variations of those shown, as well as other embodiments described herein, may be envisioned and practiced within the scope of the present disclosure.

DETAILED DESCRIPTION OF THE INVENTION

Illustrative embodiments are now described. Other embodiments may be used in addition or instead. Details that may be apparent or unnecessary may be omitted to save space or for a more effective presentation. Conversely, some embodiments may be practiced without all of the details that are disclosed.

FIG. 1 is a schematic diagram in accordance with a first embodiment of the present invention. Referring to FIG. 1, a signal transmission cable 2 has a terminal plugged into a connecting port or interface 6 (e.g., serial bus port or interface, or hot swapping port or interface) of a first electronic device 4 and another terminal connected to a second electronic device 8. The signal transmission cable 2 may be a serial bus cable, such as universal serial bus (USB) cable, serial advanced technology attachment (SATA) cable, high definition multimedia interface (HDMI) cable, or mobile industry processor interface (MIPI) cable. The first electronic device 4 may be a handheld or mobile computing device (e.g., smartphone or tablet computer), a laptop or notebook computer, a desktop computer, a portable electronic device (e.g., USB storage device, external storage device, or projector), or an electronic device having a serial bus interface or a hot swapping interface configured for receiving a signal (e.g., training sequence) from the second electronic device 8 via the signal transmission cable 2 and transmitting a signal adjusted in accordance with the present invention to the second electronic device 8 via the signal transmission cable 2. The second electronic device 8 may be an external device, such as another handheld or mobile computing device (e.g., smartphone or tablet computer), another portable electronic device (e.g., USB storage device, external storage device, or projector), or an electronic device having a serial bus interface or a hot swapping interface configured for transmitting a signal (e.g., training sequence) to the first electronic device 4 via the signal transmission cable 2 and receiving a signal adjusted in accordance with the present invention from the first electronic device 4 via the signal transmission cable 2. In one example, the first electronic device 4 may be a handheld or mobile computing device (e.g., smartphone or tablet computer), the second electronic device 8 may be the above-mentioned external device, to which the first electronic device 4 is externally connected, the signal transmission cable 2 may be a serial bus cable (e.g., USB cable), and the connecting port 6 may be a serial bus port (e.g., USB port).

The first electronic device 4 may include a controller 10, a receiving unit 12, and an output or transmit unit (or transmitter) 14. Each of the two units 12 and 14 may be a circuit or component of a physical layer. The controller 10 is coupled to the receiving unit 12 and the transmit unit 14. The receiving unit 12 is configured to receive an input signal (e.g., training signal) transmitted from an output or transmit unit 9a of the second electronic device 8; the transmit unit 14 is configured to transmit or send an output signal (e.g., signal So shown in FIG. 5) to a receiving unit 9b of the second electronic device 8. The receiving unit 12 may include an equalizer 16 and a monitor 18. The equalizer 16, such as adaptive equalizer, is configured to equalize or weigh the input signal, transmitted from the transmit unit 9a, by a receiving parameter, e.g., (energy) compensation value, into an equalized signal so as to compensate (high-frequency) energy loss of signal transmission for the input signal. The equalized signal may be transmitted from an output terminal Ts of the equalizer 16 to the monitor 18 and a processing unit 20 of the controller 10. Transmission via the signal transmission cable 2 may cause the (high-frequency) energy loss of signal transmission. The monitor 18 may have an input terminal coupled to the output terminal Ts of the equalizer 16. The monitor 18 is configured to observe the equalized signal transmitted from the output terminal Ts of the equalizer 16 so as to generate a monitoring signal (e.g., digital signal) to the processing unit 20 of the controller 10 based on the equalized signal. The monitor 18 may be or may include a voltage monitor, an eye-diagram monitor, or a monitor composed of an integrator.

The controller 10 may include the processing unit 20 and a memory unit 22 (e.g., static random access memory). The processing unit 20 is coupled to the monitor 18 and the memory unit 22. The processing unit 20 may have an input terminal coupled to the output terminal Ts of the equalizer 16 and may have two output terminals coupled to an input terminal of the transmit unit 14 and an input terminal of the equalizer 16, respectively. A set of reference values, stored in the memory unit 22, is provided to the processing unit 20 for performing a comparing procedure. As shown in FIG. 2, the set of reference values may include multiple comparison values (e.g., peaking levels), a cable length corresponding to each comparison value, and transmitting parameters corresponding to each comparison value. The transmitting parameters corresponding to each comparison value may include a voltage swing (or amplitude) of an output signal generated by the transmit unit 14 to be transmitted to the external device 8 and a difference between high-frequency and low-frequency energies of the output signal. The comparison values may be multiple compensation values, such as for high-frequency energy (i.e., peaking levels, which may be expressed in the unit of decibel (dB)), for various cable lengths by which the equalizer 16 may equalize or weigh the input signal. Alternatively, the comparison values may be a set of the differences between high-frequency and low-frequency energies (i.e., energy losses) of various input signals, resulting from, e.g., various cable lengths. The second electronic device 8 may be directly connected to the first electronic device 4 without any signal transmission cable, and thus the cable length may be set as zero.

Figure 3:
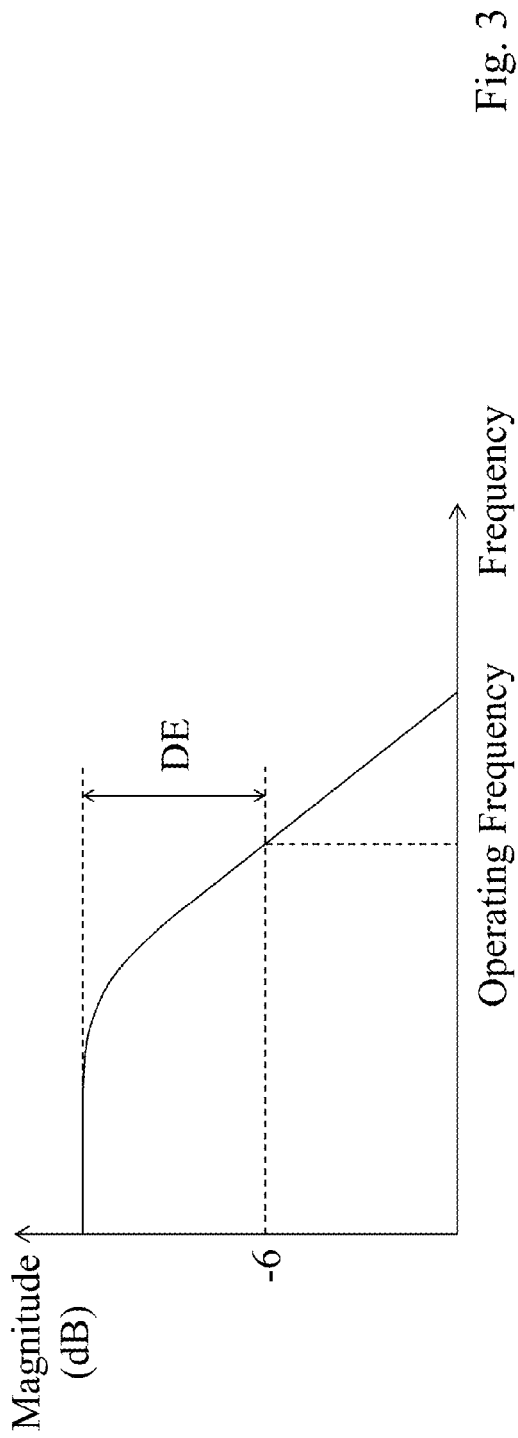
FIG. 3 shows a frequency response of a signal transmitted through a signal transmission cable in accordance with an embodiment of the present invention.
Figure 4:
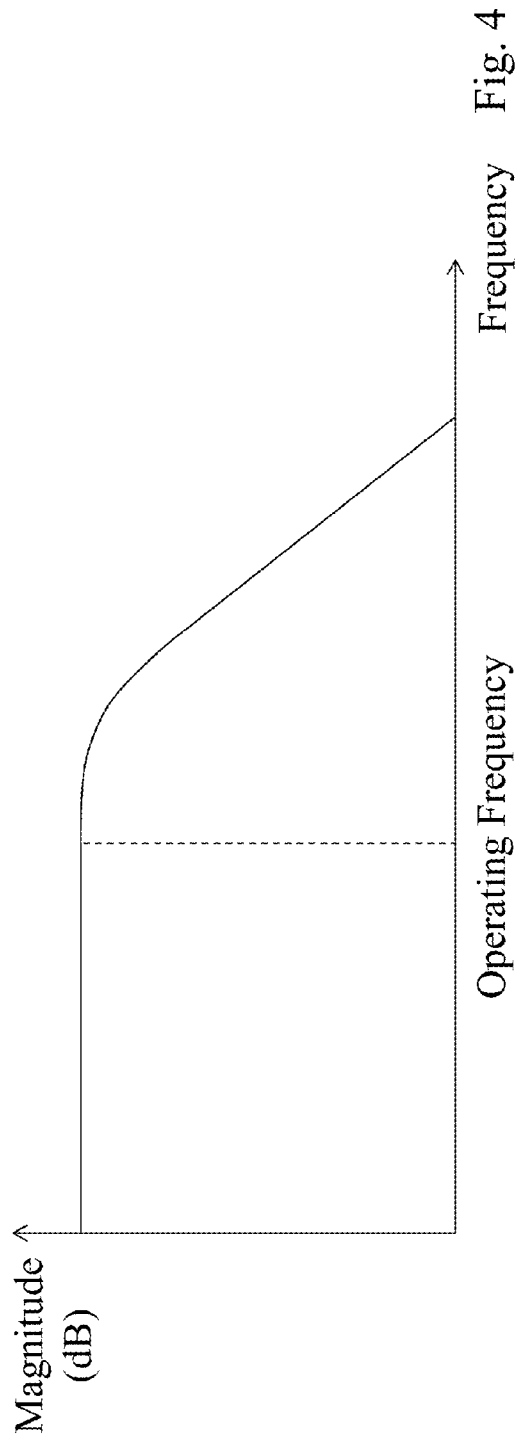
FIG. 4 shows a frequency response of a signal processed by an equalizer in accordance with an embodiment of the present invention.

Referring to FIG. 1, a training signal, such as training sequence, transmitted from the transmit unit 9a may be employed by the processing unit 20 to train the equalizer 16. At the time when training the equalizer 16 is finished, the processing unit 20 obtains an optimum receiving parameter, such as optimum compensation value (e.g., for high-frequency energy, which is also called "peaking level"), by which the equalizer 16 compensate (e.g., equalize or weigh) the training signal. The equalizer 16 may compensate (high-frequency) energy loss of the training signal, e.g., the difference between high-frequency and low-frequency energies of the training signal, based on the optimum receiving parameter (e.g., the optimum compensation value), wherein the (high-frequency) energy loss may result from signal transmission via the cable 2. In the case of the cable length being found zero, i.e., the second electronic device 8 is directly connected to the first electronic device 4 without any signal transmission cable, the optimum compensation value (e.g., peaking level) may be set as zero, as shown in FIG. 2. In the case of the second electronic device 8 being connected to the first electronic device 4 via the cable 2, the cable 2 may cause (high-frequency) energy lose to the input signal (e.g., the training signal) transmitted from the transmit unit 9a to the first electronic device 4 such that the first electronic device 4 may receive the input signal having the difference DE between high-frequency and low-frequency energies as shown in FIG. 3. Thereby, the equalizer 16 may compensate the input signal, traveling through the cable 2 to be received by the first electronic device 4, based on the optimum compensation value (e.g., peaking level) such that the high-frequency energy of the input signal may be compensated to be equal to the low-frequency energy of the input signal, as shown in FIG. 4.

Figure 5:
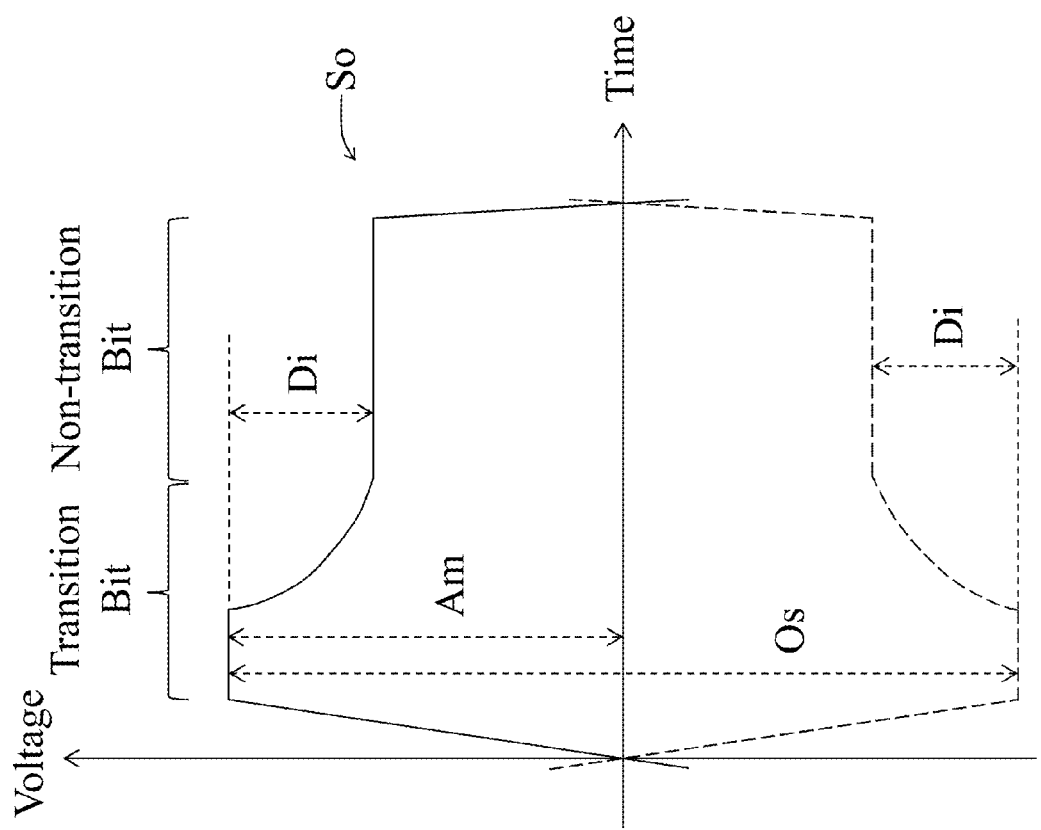
FIG. 5 shows a signal adjusted based on transmitting parameters to be generated from a transmit unit of an electronic device in accordance with an embodiment of the present invention.

Next, the processing unit 20 compares the optimum compensation value (or the difference between high-frequency and low-frequency energies of the training signal) with the comparison values listed in the set of reference values so as to obtain an approximate length of the cable 2 and/or specific transmitting parameters, which may include the difference Di between high-frequency and low-frequency energies of an output signal So and a voltage swing Os or amplitude Am of the output signal So as shown in FIG. 5. Next, the transmit unit 14 may perform a pre-emphasis or de-emphasis procedure by adjusting or weighing a transmitting signal based on the specific transmitting parameters into the output signal So to be transmitted to the receiving unit 9b of the second electronic device 8. Accordingly, the above-mentioned pre-emphasis or de-emphasis procedure performed by the transmit unit 14 adjusting the transmitting signal to meet the specific transmitting parameters may make the output signal So received at the receiving unit 9b of the external device 8 with substantially no difference between high-frequency and low-frequency energies.

In FIG. 5, the output signal So may include a transition bit and a non-transition bit. The signal So has a high-frequency component at the transition bit; the signal So has a low-frequency component at the non-transition bit. In this embodiment, the above-mentioned pre-emphasis or de-emphasis procedure may lead the output signal So to have the difference Di between high-frequency and low-frequency energies at an output port of the transmit unit 14 coupled to the signal transmission cable 2 or at the connecting port 6.

Figure 6:
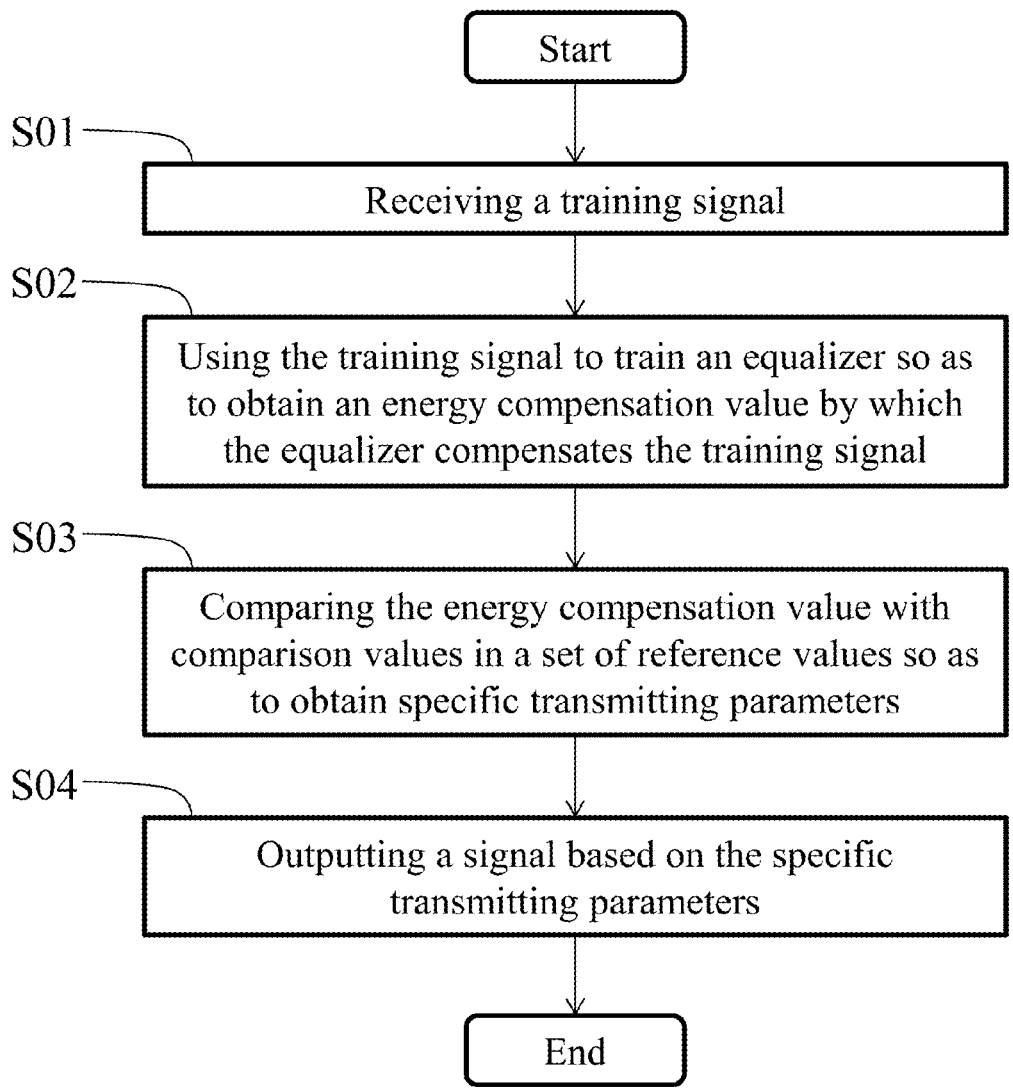
FIG. 6 is a flow chart illustrating a method of adjusting an output signal of an electronic device based on a training signal in accordance with an embodiment of the present invention.

The following steps S01 through S04 shown in FIG. 6 describe a method for the first electronic device 4 automatically adjusting its output signals when signal transmission is built between the first electronic device 4 and the second electronic device 8.

Figure 7:
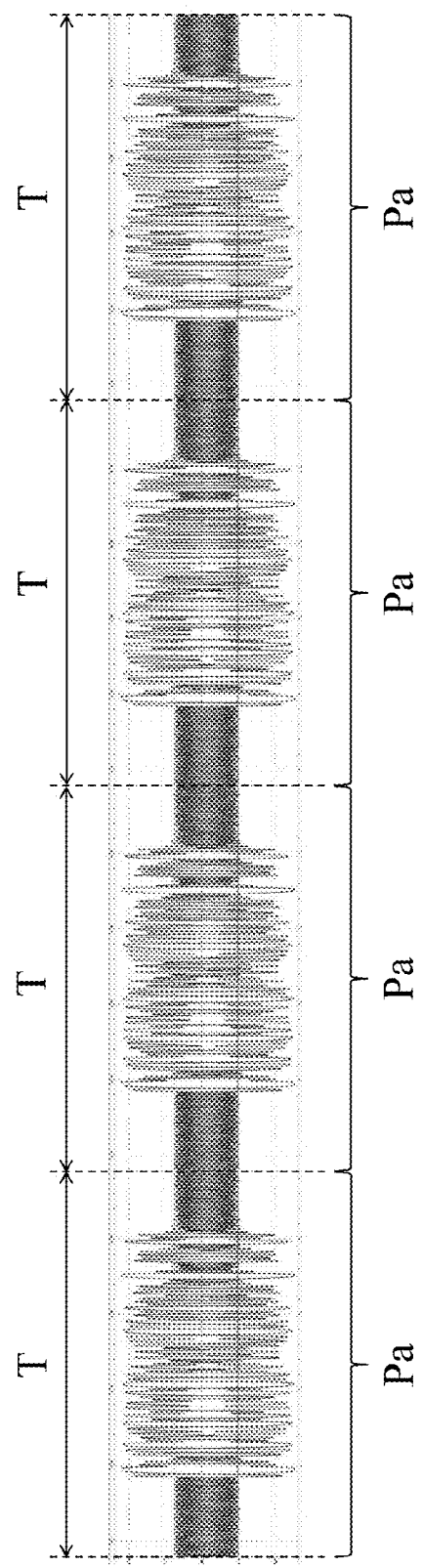
FIG. 7 shows a training signal transmitted from an electronic device to another electronic device in accordance with an embodiment of the present invention.

Step S01:

In the beginning of signal transmission between the first electronic device 4 and the second electronic device 8, the receiving unit 12 of the first electronic device 4 receives the training signal (i.e., the input signal) from the transmit unit 9a of the second electronic device 8. The training signal (e.g., training sequence) may be a differential signal in an analog form. FIG. 7 shows an example of the training signal. As shown in FIG. 7, the training signal includes multiple packets Pa having the same components and the same transmission periods T.

Step S02:

The training signal may be employed by the processing unit 20 to train the equalizer 16 until an optimum compensation value (e.g., compensation value for high-frequency energy, which is also called "peaking level") may be obtained by which the equalizer 16 may compensate (e.g., equalize or weigh) the training signal. Transmission via the signal transmission cable 2 may cause (high-frequency) energy loss of the training signal. The optimum compensation value may compensate the (high-frequency) energy loss of the training signal, e.g., the difference between high-frequency and low-frequency energies of the training signal. Based on the optimum compensation value, the equalizer 16 may compensate (e.g., equalize or weigh) subsequent signals transmitted from the transmit unit 9a of the external device 8 to the receiving unit 12 of the electronic device 4.

In the step S02, the processing unit 20 watches or monitors the monitoring signal to determine if the training signal equalized or weighed by the equalizer 16 meets a specific state or condition. The monitor 18 is coupled to the output terminal Ts of the equalizer 16 so as to monitor the training signal equalized or weighed by the equalizer 16 (hereinafter called "equalized signal Eo") and then to process the equalized signal Eo into the monitoring signal (e.g., digital signal) at an output of the monitor 18 coupled to the processing unit 20. The processing unit 20 constantly analyzes, detects or monitors the monitoring signal transmitted from the output of the monitor 18 in a unit of a fixed time period, which may be greater than or equal to the transmission period T of each packet Pa. The processing unit 20 may monitor a portion of the monitoring signal in a unit of the fixed time period, due to the training signal containing a plurality of the same packet Pa, to determine whether the equalized signal Eo has its high-frequency energy (substantially) equal to its low frequency energy or whether an eye diagram of the equalized signal Eo meets an optimum condition.

If the monitoring signal transmitted from the output of the monitor 18 indicates that the equalized signal Eo has its high-frequency energy (substantially) unequal to its low frequency energy and/or the equalized signal Eo has an eye diagram not meeting the optimum condition, the processing unit 20 may update the receiving parameter, such as compensation value for high-frequency energy, by which the equalizer 16 may compensate (e.g., equalize or weigh) the training signal into an update equalized signal Eo that may be processed by the monitor 18 into an updated monitoring signal that may be monitored by the processing unit 20 to determine whether the update equalized signal Eo has its high-frequency energy (substantially) equal to its low frequency energy and/or whether the update equalized signal Eo has an eye diagram meeting the optimum condition. The above process is repeated until the update monitoring signal indicates that the update equalized signal Eo has its high-frequency energy (substantially) equal to its low frequency energy and/or the update equalized signal Eo has an eye diagram meeting the optimum condition. As the monitoring signal indicates that the update equalized signal Eo has its high-frequency energy (substantially) equal to its low frequency energy and/or the update equalized signal Eo has an eye diagram meeting the optimum condition, the update receiving parameter may be set as the optimum receiving parameter, such as optimum compensation value for high-frequency energy, by which the equalizer 16 may equalize or weigh the training signal to compensate the energy loss of signal transmission. As mentioned above, the step S02 may be performed to train the equalizer 16.

Step S03:

After obtaining the optimum receiving parameter (e.g., the optimum compensation value) the processing unit 20 performs a comparing procedure, that is, the processing unit 20 compares the optimum receiving parameter with the comparison values in the above-mentioned set of reference values stored in the memory unit 22 to determine the length of the cable 2 and/or specific transmitting parameters corresponding to the length of the cable 2, including the difference between high-frequency and low-frequency energies of the output signal and a voltage swing or amplitude of the output signal.

Step S04:

After the step S03 is performed, the transmit unit 14 may be adjusted based on the specific transmitting parameters such that the transmit unit 14 may weigh or adjust a transmitting signal by the specific transmitting parameters into the output signal (e.g., differential signal So in an analog form as shown in FIG. 5) to be transmitted to the receiving unit 9b of the second electronic device 8. Accordingly, based on the optimum receiving parameter (e.g., the optimum compensation value for high-frequency energy) by which the equalizer 16 compensate (e.g., equalize or weigh) the training signal into the update equalized signal Eo, the first electronic device 4 may adjust or weigh a transmitting signal into the output signal (e.g., signal So shown in FIG. 5) to be transmitted to the second electronic device 8.

Figure 8:
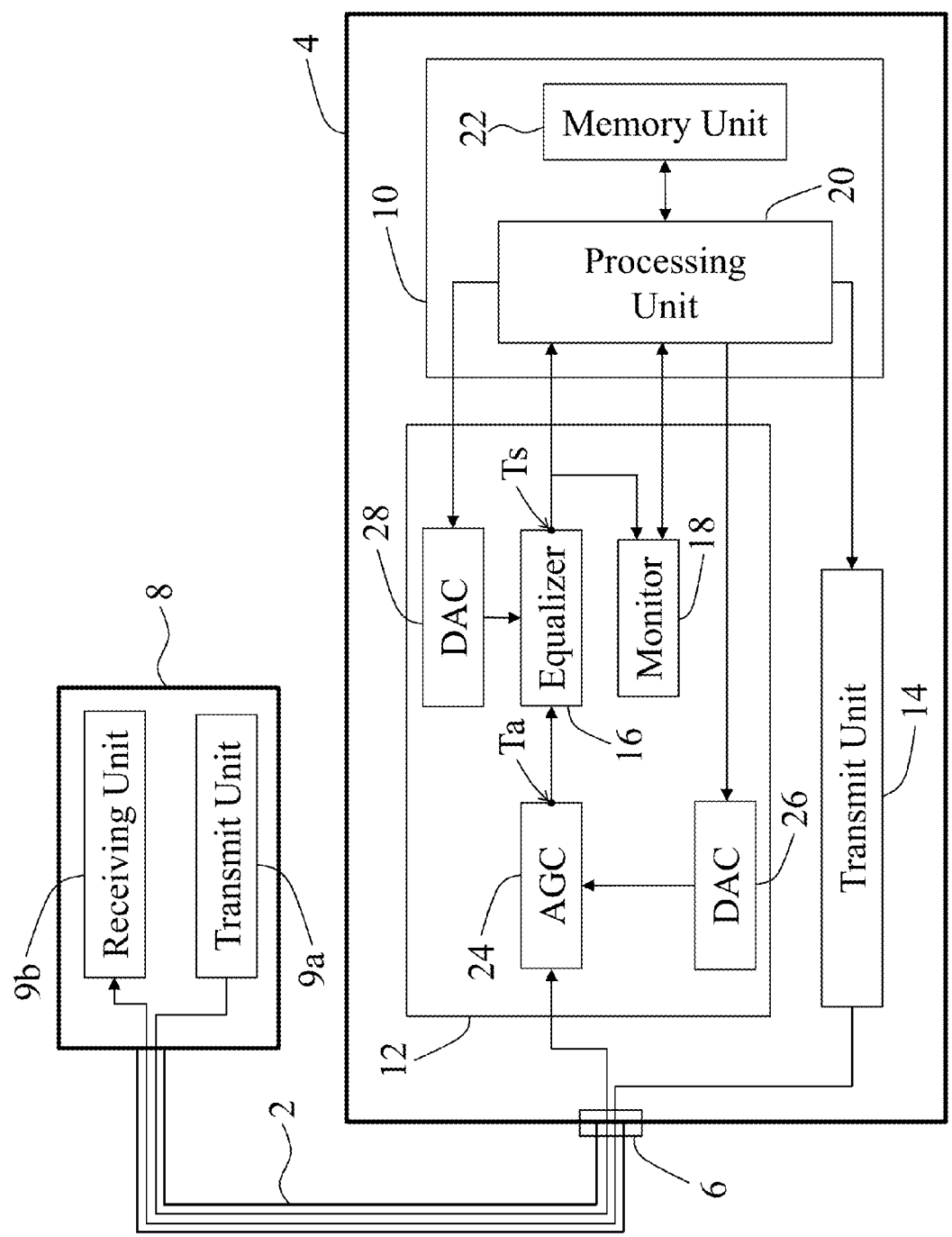
FIG. 8 is a system block diagram in accordance with a second embodiment of the present invention.

FIG. 8 is a schematic diagram in accordance with a second embodiment of the present invention. Referring to FIG. 8, the receiving unit 12 of the first electronic device 4 may further include an automatic gain control (AGC) unit 24 and two digital-to-analog converters (DACs) 26 and 28. The AGC unit 24 may have an output terminal Ta coupled to an input terminal of the equalizer 16. The DAC 26 may have an input terminal coupled to an output terminal of the processing unit 20 and an output terminal coupled to an input terminal of the AGC unit 24. The DAC 28 may have an input terminal coupled to an output terminal of the processing unit 20 and an output terminal coupled to an input terminal of the equalizer 16. In the second embodiment, the monitor 18 may exclude a digital-to-analog converter such that an area of a physical layer occupied by the monitor 18 and the cost of manufacturing the first electronic device 4 may be reduced.

The AGC unit 24 is configured to receive the input signal (e.g., the training signal) transmitted from the transmit unit 9a of the second electronic device 8 and amplify or weigh the input signal by a gain value, that is, adjust a voltage swing of the input signal, into a gained signal (e.g., gained signal SA or SG mentioned in FIG. 10 or 12) to be transmitted from the output terminal Ta of the AGC unit 24 to the equalizer 16. The equalizer 16 is configured to compensate (e.g., equalize or weigh) the gained signal, transmitted from the AGC unit 24, by a receiving parameter, such as compensation value for high-frequency energy, into an equalized signal (e.g., equalized signal SE or SQ mentioned in FIG. 10 or 12) to be transmitted from its output terminal Ts to the monitor 18 and/or the processing unit 20. The DAC 26 is configured to convert a first digital signal, generated by the processing unit 20 to adjust or control the AGC unit 24, into a first analog signal to be transmitted to the AGC unit 24. Thereby, the processing unit 20 may generate the first digital signal to adjust or control the AGC unit 24 to amplify or weigh the input signal (e.g., the training signal) transmitted from the transmit unit 9a of the second electronic device 8 by the gain value updated based on the first analog signal. The DAC 28 is configured to convert a second digital signal, generated by the processing unit 20 to adjust or control the equalizer 16, into a second analog signal to be transmitted to the equalizer 16. Thereby, the processing unit 20 may generate the second digital signal to adjust or control the equalizer 16 to compensate (e.g., equalize or weigh) the gained signal by the receiving parameter, such as compensation value for high-frequency energy, which is also called "peaking level", updated based on the second analog signal.

In this embodiment, the processing unit 20 may constantly analyze, detect or monitor the monitoring signal (e.g., digital signal) transmitted from the monitor 18 in a unit of the fixed time period, which may be greater than or equal to the transmission period T of each packet Pa. The processing unit 20 may monitor a portion of the monitoring signal in a unit of the fixed time period, due to the training signal containing a plurality of the same packet Pa, to determine whether the gained signal at the output terminal Ta of the AGC unit 24 and/or the equalized signal at the output terminal Ts of the equalizer 16 meets a specific condition in the unit of the fixed time period. For example, the processing unit 20 may detect whether the monitoring signal has a transition or not in a unit of the fixed time period so as to determine whether the gained signal or the equalized signal has its maximum (voltage) swing within a reference range of two specific voltage values. The two specific voltage values may be two respective voltages for linear operation for the first electronic device 4.

Figure 9A:
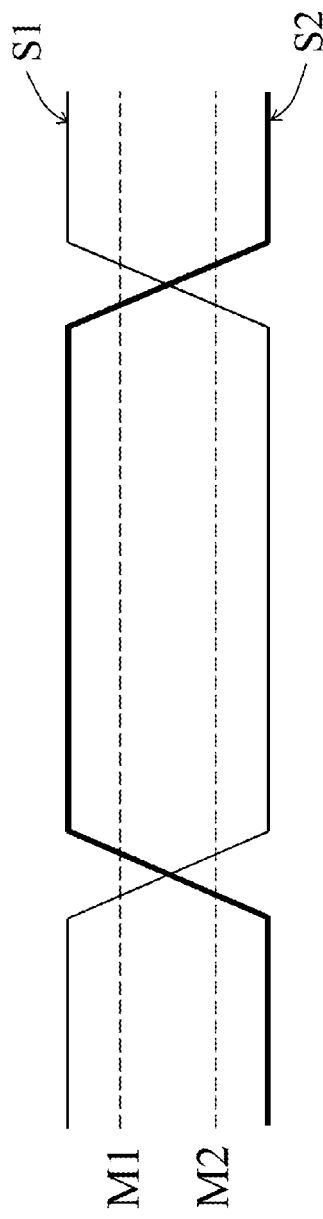
FIG. 9A shows an equalized signal generated by an equalizer of an electronic device in accordance with an embodiment of the present invention.
Figure 9B:
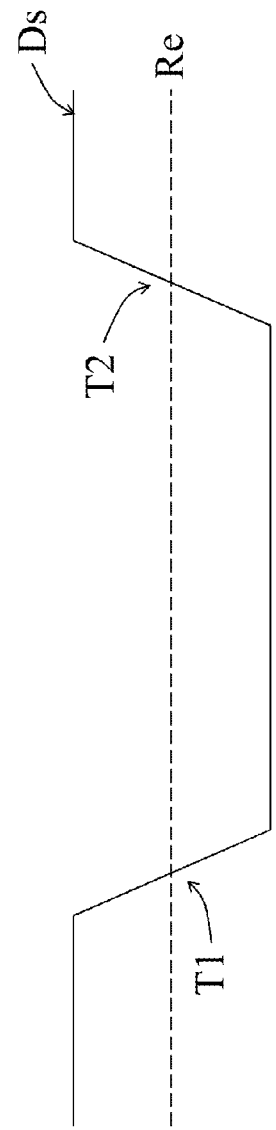
FIG. 9B shows a monitoring signal generated by a monitor of an electronic device in accordance with an embodiment of the present invention.

With regards to the first and second embodiments, FIG. 9A shows the equalized signal, such as first and second signals S1 and S2 composing a differential signal, generated by the equalizer 16 and the two specific voltage values, such as two voltages M1 and M2, for linear operation for the first electronic device 4. FIG. 9B shows the monitoring signal, such as signal Ds, and a reference signal Re. Referring to FIGS. 9A and 9B, the monitoring signal Ds may be generated by the monitor 18 based on a first difference of the first and second signals S1 and S2 at the output terminal Ts of the equalizer 16 and a second difference of the two voltages M1 and M2. In one example, the first difference of the first and second signals S1 and S2 may be an (absolute) value of a first voltage difference obtained by subtracting the voltage of the second signal S2 from the voltage of the first signal S1. The second difference of the two voltage values M1 and M2 may be an (absolute) value of a second voltage difference obtained by subtracting the voltage M2 from the voltage M1. The signal Ds may be obtained by subtracting the second difference from the first difference. The reference signal Re may be a third voltage difference obtained by, e.g., subtracting the voltage M1 from the voltage M2.

In FIG. 9B, at a time point T1, the monitoring signal Ds transmitted from the monitor 18 has a first transition from a logic level "1" to a logic level "0" (i.e., the signal Ds changes from greater than the reference voltage Re to less than the reference voltage Re). At a time point T2, the monitoring signal Ds has a second transition from a logic level "0" to a logic level "1" (i.e., the signal Ds changes from less than the reference voltage Re to greater than the reference voltage Re). The first and second transitions of the monitoring signal Ds represent the equalized signal (i.e., first and second signals S1 and S2) at the output terminal Ts of the equalizer 16 has a voltage swing with a swing range exceeding a reference range of the two voltages M1 and M2. If the monitoring signal Ds has no transition in a unit of the fixed time period, it represents that the training signal adjusted or amplified by the gain value and/or compensated or equalized by the receiving parameter has its maximum voltage swing with a swing range within the reference range of the two voltages M1 and M2.

The architecture illustrated in the second embodiment in FIG. 8 may be employed to perform the steps S01 through S04 illustrated in FIG. 6. The steps S01, S03 and S04 performed in the second embodiment may be referred to the related description in FIG. 6. The step S02 in the second embodiment may include steps S11 through S14 depicted in FIG. 10, as described below. In the steps S11 through S14, the processing unit 20 constantly monitors or detects the monitoring signal transmitted from the monitor 18 in a unit of the fixed time period, which may be greater than or equal to the transmission period T of each packet Pa.

Figure 11A:
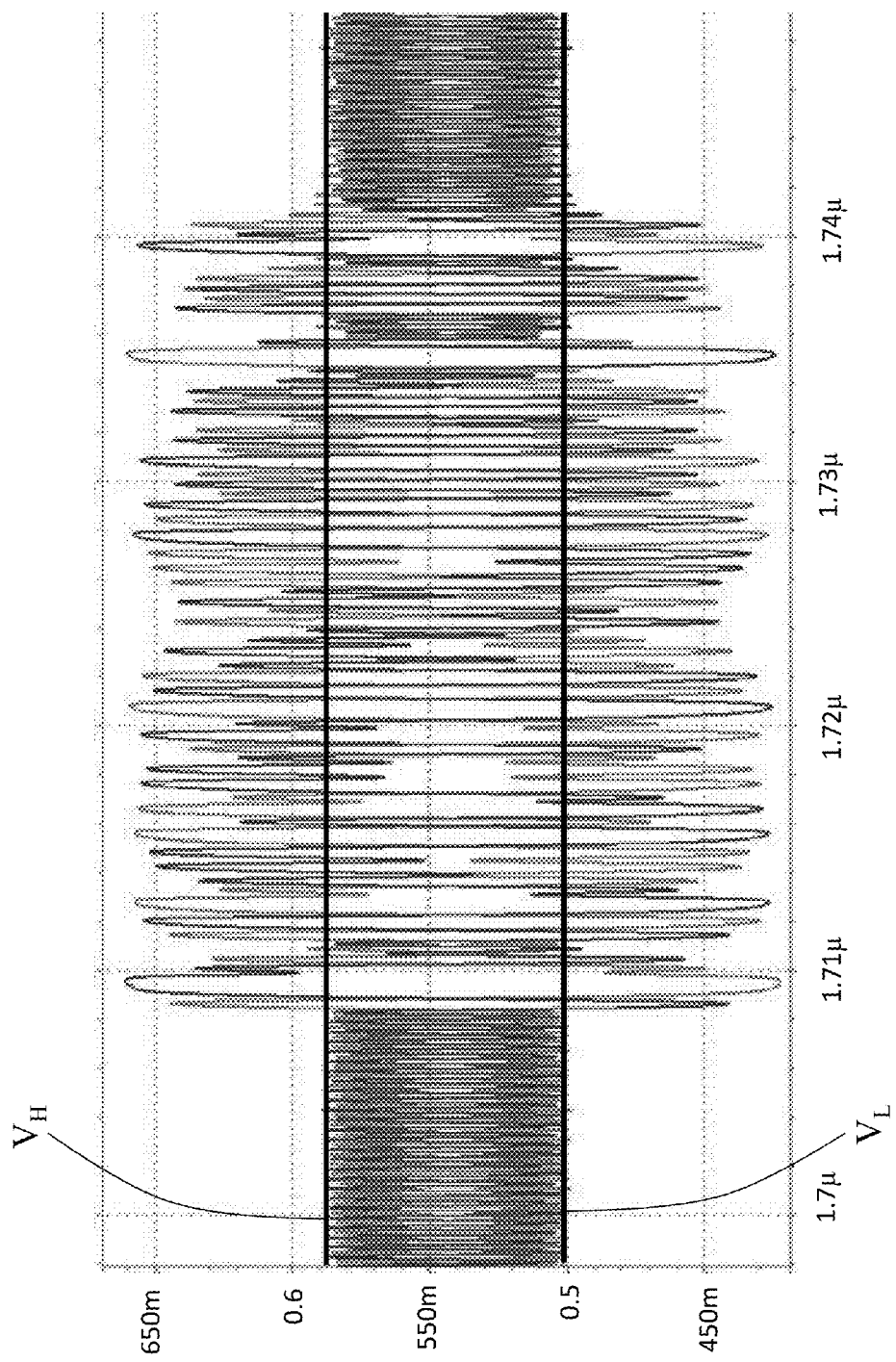
FIG. 11A shows a training signal in a unit of a fixed time period in accordance with an embodiment of the present invention.

Step S11:

The AGC unit 24 adjusts or amplifies the training signal by a first gain value (e.g., the maximum gain value) into a gained signal SA at the output terminal Ta of the AGC unit 24 such that the gained signal SA has its maximum voltage swing at, e.g., its low-frequency portion to exceed a reference range of two specific voltage values VH and VL in a unit of the fixed time period, as shown in FIG. 11A. The voltage value VH may be the voltage M1, and the voltage value VL may be the voltage M2. Before the step S13 is performed, the equalizer 16 may compensate (e.g., equalize or weigh) the gained signal SA by a first compensation value, such as the minimum compensation value for high-frequency energy, such that the equalizer 16 compensates the gained signal SA at a minimum level or even the equalizer 16 does not compensate the gained signal SA any more. In the step S11, as the AGC unit 24 amplifies the training signal by the first gain value into the gained signal SA and the equalizer 16 compensates the gained signal SA by the first compensation value, the processing unit 20 detects that the monitoring signal transmitted from the monitor 18 has a transition in a unit of the fixed time period.

Figure 11B:
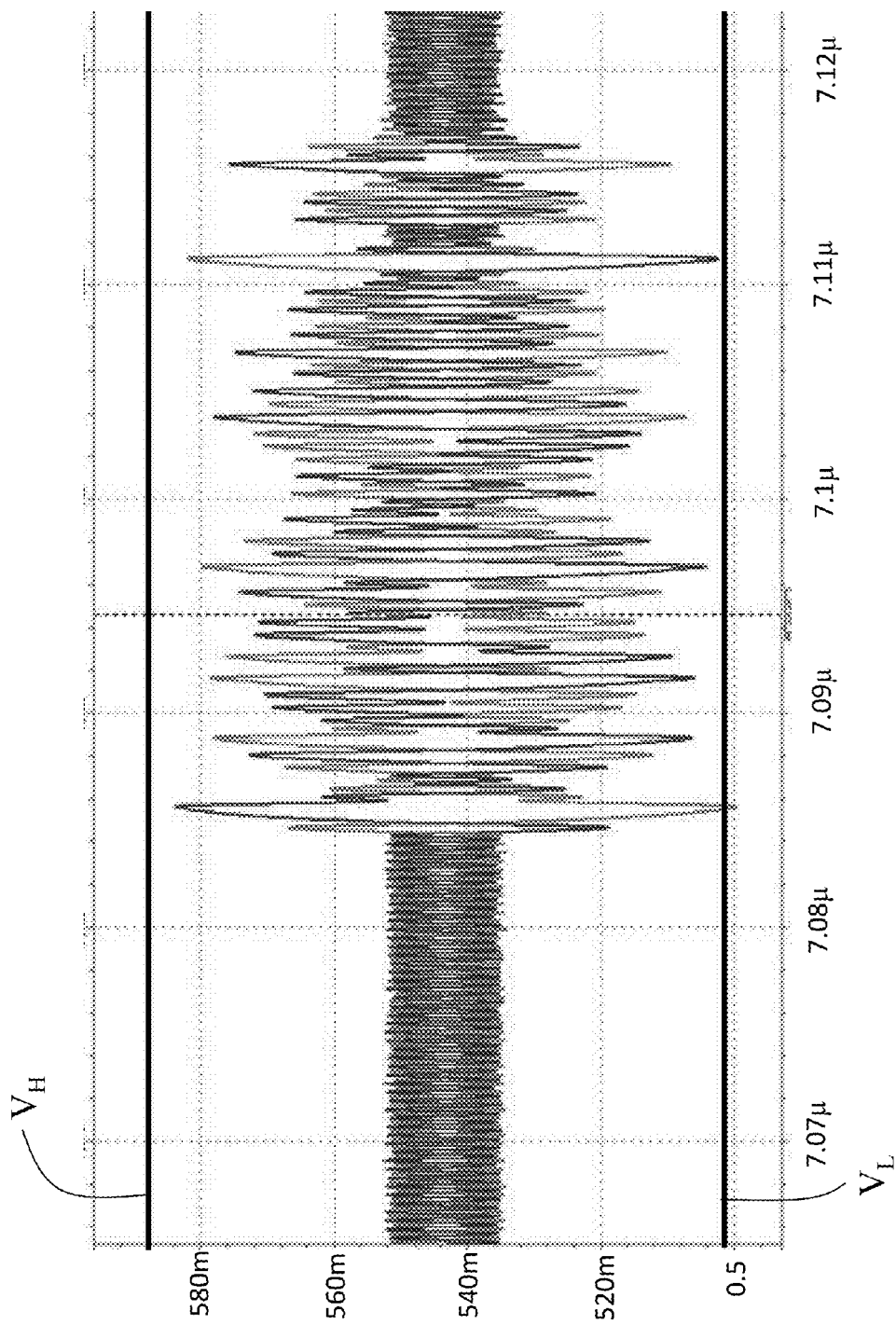
FIG. 11B shows an output signal from an automatic gain control (AGC) unit in a unit of a fixed time period in accordance with an embodiment of the present invention.

Step S12:

After the step S11 is performed, the first gain value for the training signal is gradually lowered level by level to a second gain value (hereinafter called "gain value GF") until the gained signal SA has its maximum voltage swing at, e.g., its low-frequency portion to be within the reference range of the two specific voltage values VH and VL in a unit of the fixed time period, as shown in FIG. 11B. In response thereto, the processing unit 20 detects that the monitoring signal transmitted from the monitor 18 has no transition in the unit of the fixed time period. The AGC unit 24 may adjust, amplify or weigh subsequent signals (including the remaining training signal), transmitted from the transmit unit 9a to the receiving unit 12, by the gain value GF. After the step S12 is performed, the low-frequency energy of the training signal may be obtained based on the two specific voltage values VH and VL.

Figure 11C:
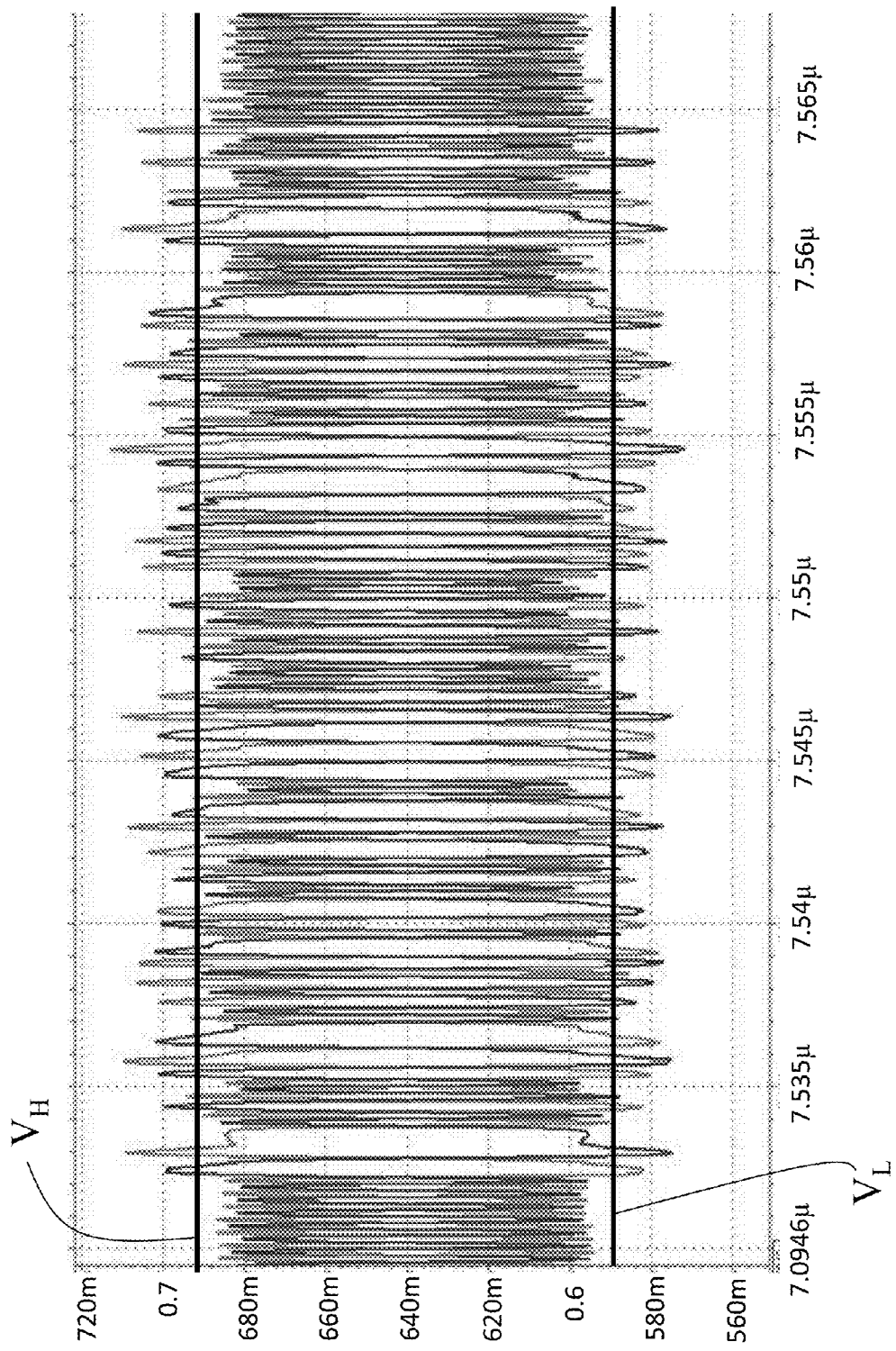
FIG. 11C shows an output signal from an equalizer in a unit of a fixed time period in accordance with an embodiment of the present invention.

Step S13:

After the step S12 is performed, the equalizer 16 compensates (e.g., equalizes or weighs) the gained signal SA, amplified by the gain value GF, by a second compensation value, such as the maximum compensation value for high-frequency energy, into an equalized signal SE at the output terminal Ts of the equalizer 16. The equalized signal SE has its maximum voltage swing at, e.g., its high-frequency energy portion beyond the reference range of the two specific voltage values VH and VL in a unit of the fixed time period, as shown in FIG. 11C. In response thereto, the processing unit 20 detects that the monitoring signal transmitted from the monitor 18 has a transition in the unit of the fixed time period. The second compensation value may be greater than the first compensation value described in the step S11. In the step S13, the equalized signal SE has its high-frequency energy greater than its low-frequency energy. The equalized signal SE may be the equalized signal Eo described in the step S02.

Figure 11D:
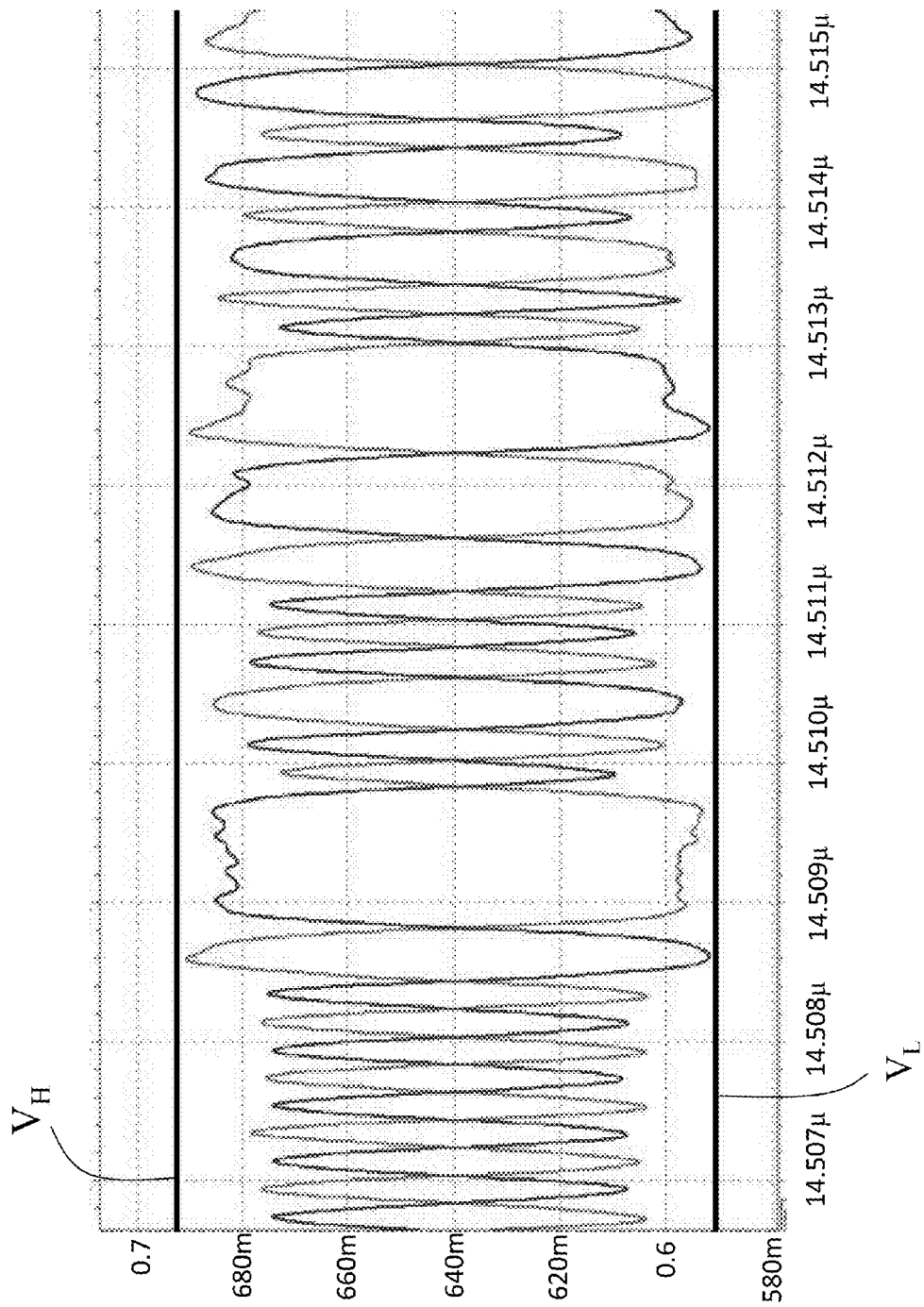
FIG. 11D shows an output signal from an equalizer in a unit of a fixed time period in accordance with an embodiment of the present invention.

Step S14:

After the step S13 is performed, the second compensation value may be gradually lowered level by level to a third compensation value (hereinafter called "energy compensation value PA") until the equalized signal SE has its maximum voltage swing at, e.g., its high-frequency energy portion to be within the reference range of the two specific voltage values VH and VL in a unit of the fixed time period, as shown in FIG. 11D. In response thereto, the processing unit 20 detects that the monitoring signal transmitted from the monitor 18 has no transition in the unit of the fixed time period. At this time, the processing unit 20 saves the energy compensation value PA. The equalizer 16 compensates (e.g., weighs or equalizes) subsequent signals transmitted from the transmit unit 9a to the receiving unit 12 by the energy compensation value PA. The energy compensation value PA (i.e., the optimum compensation value by which the equalizer 16 compensates the training signal, as described in the step S02) is greater than the first compensation value described in the step S11 but less than the second compensation value described in the step S13.

After the step S14 is performed, the equalized signal SE, compensated by the energy compensation value PA, has its high-frequency energy (substantially) equal to its low-frequency energy and the step S02 of training the equalizer 16 may be finished. In the step S03, the processing unit 20 performs the comparing procedure, that is, the processing unit 20 may compare the energy compensation value PA with the comparison values in the above-mentioned set of reference values stored in the memory unit 22 to determine the length of the cable 2 and/or the specific transmitting parameters corresponding to the length of the cable 2, including the difference between high-frequency and low-frequency energies of the output signal and a voltage swing or amplitude of the output signal.

Figure 10:
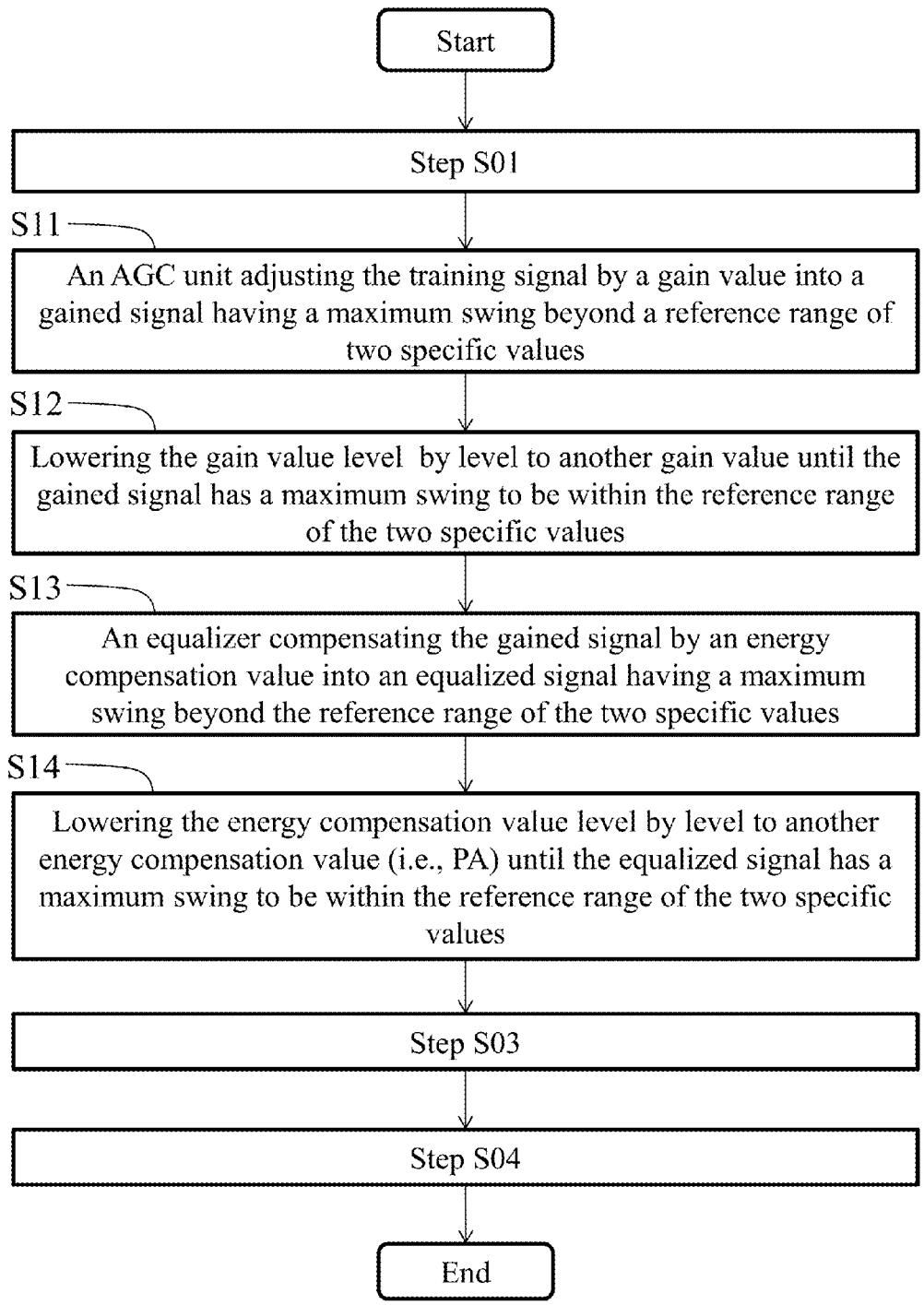
FIG. 10 is a flow chart illustrating a method of adjusting an output signal from an electronic device based on a training signal in accordance with an embodiment of the present invention.
Figure 12:
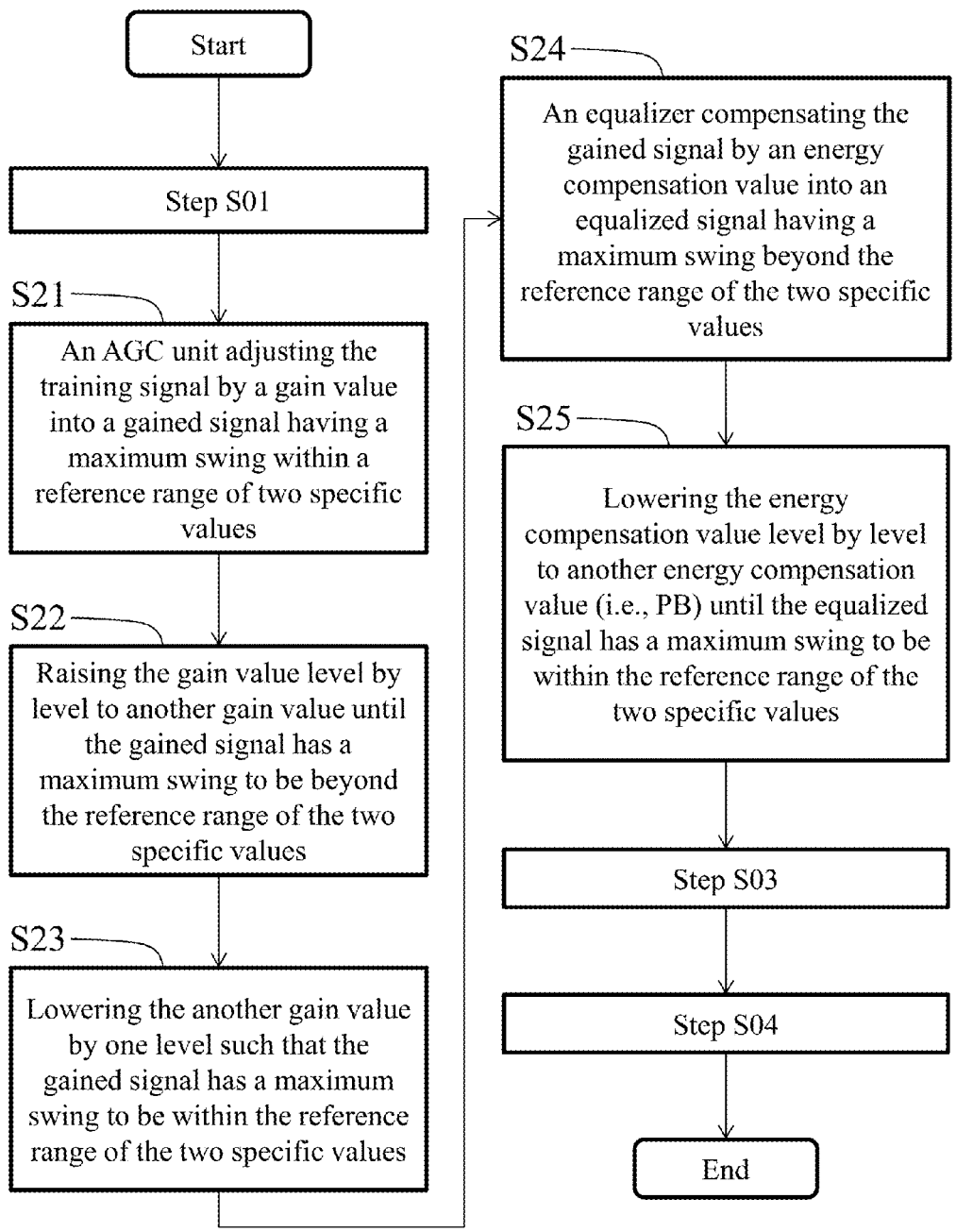
FIG. 12 is a flow chart illustrating a method of adjusting an output signal from an electronic device based on a training signal in accordance with an embodiment of the present invention.

Alternatively, the steps S11 through S14 as illustrated in FIG. 10 may be replaced with steps S21 through S25 as depicted in FIG. 12. In the steps S21 through S25, the processing unit 20 monitors or detects the monitoring signal transmitted from the monitor 18 in a unit of the fixed time period, which may be greater than or equal to the transmission period T of each packet Pa.

Step S21:

The AGC unit 24 adjusts or amplifies the training signal by a third gain value (e.g., the minimum gain value) into a gained signal SG at the output terminal Ta of the AGC unit 24 such that the gained signal SG has its maximum voltage swing at, e.g., its low-frequency portion to be within the reference range of the two specific voltage values VH and VL in a unit of the fixed time period. The voltage value VH may be the voltage M1, and the voltage value VL may be the voltage M2. Before the step S24 is performed, the equalizer 16 may compensate (e.g., equalize or weigh) the gained signal SG by a fourth compensation value, such as the minimum compensation value for high-frequency energy, such that the equalizer 16 compensates the gained signal SG at a minimum level or even the equalizer 16 does not compensate the gained signal SG any more. In the step S21, as the AGC unit 24 amplifies the training signal by the third gain value into the gains signal SG and the equalizer 16 compensates the gained signal SG by the fourth compensation value, the processing unit 20 may detect that the monitoring signal transmitted from the monitor 18 has no transition in a unit of the fixed time period.

Step S22:

After the step S21 is performed, the third gain value for the training signal is gradually raised level by level to a fourth gain value (hereinafter called "gain value Gn") until the gained signal SG has its maximum voltage swing at, e.g., its low-frequency portion to be beyond the reference range of the two specific voltage values VH and VL in a unit of the fixed time period. In response thereto, the processing unit 20 detects that the monitoring signal transmitted from the monitor 18 has a transition in the unit of the fixed time period.

Step S23:

After the step S22 is performed, the gain value Gn for the training signal is lowered by one level to a previous gain value (hereinafter called "gain value Gn−1") such that the gained signal SG has its maximum voltage swing at, e.g., its low-frequency portion to be within the reference range of the two specific voltage values VH and VL in a unit of the fixed time period, and the processing unit 20 detects that the monitoring signal transmitted from the monitor 18 has no transition in the unit of the fixed time period. The AGC unit 24 adjusts, amplifies or weighs subsequent signals (including the remaining training signals), transmitted from the transmit unit 9a to the receiving unit 12, by the gain value Gn−1. After the step S23 is performed, the low-frequency energy of the training signal may be obtained based on the two specific voltage values VH and VL.

Step S24:

After the step S23 is performed, the equalizer 16 compensates (e.g., equalizes or weighs) the gained signal SG, amplified by the gain value Gn−1, by a fifth compensation value, such as the maximum compensation value for high-frequency energy, into an equalized signal SQ at the output terminal Ts of the equalizer 16. The equalized signal SQ has its maximum voltage swing at, e.g., its high-frequency energy portion beyond the reference range of the two specific voltage values VH and VL in a unit of the fixed time period. In response thereto, the processing unit 20 detects that the monitoring signal transmitted from the monitor 18 has a transition in the unit of the fixed time period. The fifth compensation value may be greater than the fourth compensation value described in the step S21. In the step S24, the equalized signal SQ has its high-frequency energy greater than its low-frequency energy. The equalized signal SQ may be the equalized signal Eo described in the step S02.

Step S25:

After the step S24 is performed, the fifth compensation value may be gradually lowered level by level to a sixth compensation value (hereinafter called "energy compensation value PB") until the equalized signal SQ has its maximum voltage swing at, e.g., its high-frequency energy portion to be within the reference range of the two specific voltage values VH and VL in a unit of the fixed time period. In response thereto, the processing unit 20 detects that the monitoring signal transmitted from the monitor 18 has no transition in the unit of the fixed time period. At this time, the processing unit 20 saves the energy compensation value PB. The equalizer 16 compensates (e.g., weighs or equalizes) subsequent signals transmitted from the transmit unit 9a to the receiving unit 12 by the energy compensation value PB. The energy compensation value PB (i.e., the optimum compensation value by which the equalizer 16 compensates the training signal, as described in the step S02) is greater than the fourth compensation value described in the step S21 but less than the fifth compensation value described in the step S24.

After the step S25 is performed, the equalized signal SQ, compensated by the energy compensation value PB, has its high-frequency energy (substantially) equal to its low-frequency energy and the step S02 of training the equalizer 16 may be finished. In the step S03, the processing unit 20 performs the comparing procedure, that is, the processing unit 20 may compare the energy compensation value PB with the comparison values in the above-mentioned set of reference values stored in the memory unit 22 to determine the length of the cable 2 and/or the specific transmitting parameters corresponding to the length of the cable 2, including the difference between high-frequency and low-frequency energies of the output signal and a voltage swing or amplitude of the output signal.

For the first and second embodiments, the output signal (e.g., differential signal in an analog form) generated by the transmit unit 14 of the first electronic device 4 to the receiving unit 9b of the second electronic device 8 may be adjusted based on the lengths of various signal transmission cables for connecting the first electronic device 4 to the second electronic device 8 (i.e., electronic product). For example, when a first signal transmission cable is employed to couple the first electronic device 4 to the second electronic device 8, the output signal (hereinafter called "first signal") generated by the transmit unit 14 of the first electronic device 4 to the receiving unit 9b of the second electronic device 8 may be adjusted, weighed or compensated based on first output parameters (including the difference between high-frequency and low-frequency energies, voltage swing and/or amplitude) corresponding to the length of the first signal transmission cable. When a second signal transmission cable is employed to couple the first electronic device 4 to the second electronic device 8, the output signal (hereinafter called "second signal") generated by the transmit unit 14 of the first electronic device 4 to the receiving unit 9b of the second electronic device 8 may be adjusted, weighed or compensated by second output parameters (including the difference between high-frequency and low-frequency energies, voltage swing and/or amplitude) corresponding to the length of the second signal transmission cable. The first and second signal transmission cables may be two respective serial bus cables of different lengths, such as two respective USB cables of different lengths, two respective SATA cables of different lengths, two respective HDMI cables of different lengths, or two respective MIPI cables of different lengths.

In the case of the second signal transmission cable having a cable length greater than or equal to 90, 100 or 110 times that of the first signal transmission cable, the second signal at the connecting port 6 has a voltage swing (which may be a voltage swing of a low frequency component of the second signal at, e.g., its non-transition bit) greater than or equal to 1.3, 1.4 or 1.5 times a voltage swing of the first signal (which may be a voltage swing of a low frequency component of the first signal at, e.g., its non-transition bit) at the connecting port 6. In addition, a voltage swing of the low frequency component of the second signal, e.g., at its non-transition bit, received by the second electronic device 8 may be greater than or equal to 1.3, 1.4 or 1.5 times a voltage swing of the low frequency component of the first signal, e.g., at its non-transition bit, received by the second electronic device 8.

Figure 13A:
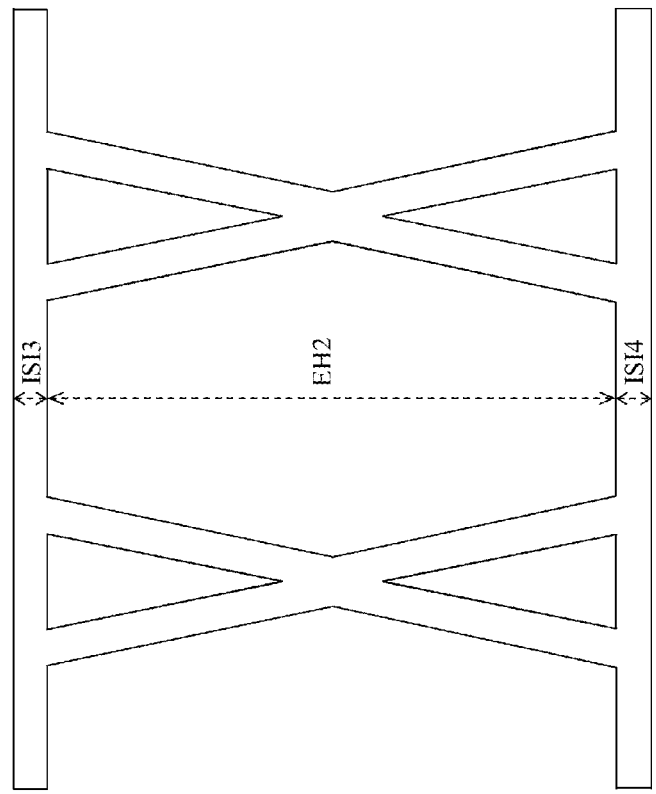
FIG. 13A shows an eye diagram obtained from a signal transmitted to an electronic device in accordance with an embodiment of the present invention.
Figure 13B:
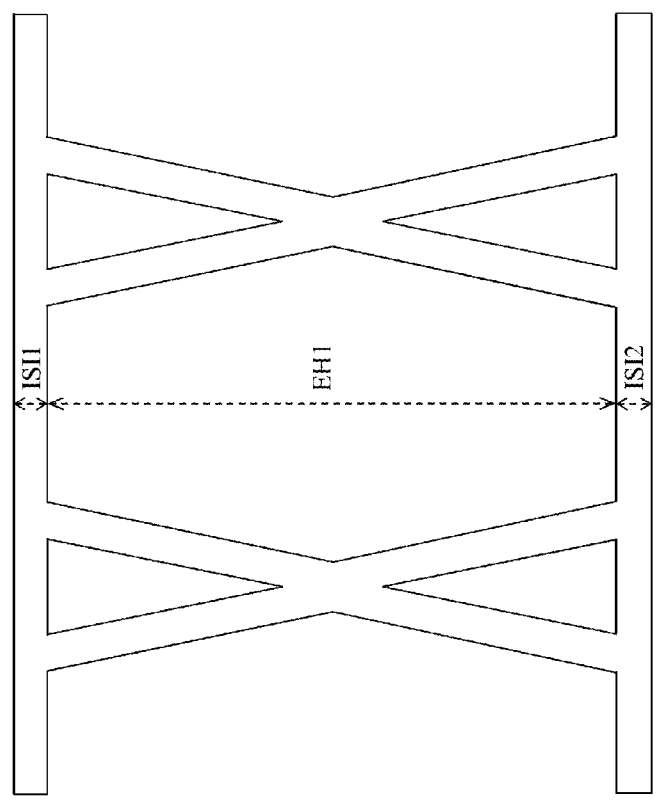
FIG. 13B shows an eye diagram obtained from a signal transmitted to an electronic device in accordance with an embodiment of the present invention.

In the case of the second electronic device 8 receiving the first signal through the first signal transmission cable, the second electronic device 8 may obtain or generate an eye diagram based on the first signal, as shown in FIG. 13A. In FIG. 13A, the sum of two inter symbol interferences ISI1 and ISI2 is less than or equal to 0.3, 0.2 or 0.1 times an eye height EH1 of the eye diagram. In the case of the second electronic device 8 receiving the second signal through the second signal transmission cable, the second electronic device 8 may obtain or generate another eye diagram based on the second signal, as shown in FIG. 13B. In FIG. 13B, the sum of two inter symbol interferences ISI3 and ISI4 is less than or equal to 0.3, 0.2 or 0.1 times an eye height EH2 of the eye diagram. In the two examples shown in FIGS. 13A and 13B, the second signal transmission cable may have a cable length greater than or equal to 90, 100 or 110 times that of the first signal transmission cable.

The second electronic device 8 may be connected to the first electronic device 4 via wireless communication (e.g., Bluetooth, ultra-wideband, wireless fidelity, radio frequency identification, near field communication, or ZigBee) other than the signal transmission cable 2. In this case, the receiving unit 12 of the first electronic device 4 receives the training signal (e.g., training sequence) transmitted from the second electronic device 8 via wireless communication, and the transmit unit 14 of the first electronic device 4 transmits the output signal to the second electronic device 8 via wireless communication. By using the method described in FIG. 6, 10 or 12, the first electronic device 4 may compensate the (wireless) signal transmission between the two devices 4 and 8 and generate the output signal based on the specific transmitting parameters (including, e.g., the value of a voltage swing or amplitude of the output signal, and the difference between high-frequency and low-frequency energies of the output signal), wherein the specific transmitting parameters may be obtained based on the optimum compensation value by which the equalizer 16 compensates the training signal, as illustrated in the first and second embodiments. For details, please refer to the relevant description.

The components, steps, features, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, benefits and advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. Furthermore, unless stated otherwise, the numerical ranges provided are intended to be inclusive of the stated lower and upper values. Moreover, unless stated otherwise, all material selections and numerical values are representative of preferred embodiments and other ranges and/or materials may be used.

The scope of protection is limited solely by the claims, and such scope is intended and should be interpreted to be as broad as is consistent with the ordinary meaning of the language that is used in the claims when interpreted in light of this specification and the prosecution history that follows, and to encompass all structural and functional equivalents thereof.

What is claimed is:

1. A method for transceiving a signal, comprising:
   training an equalizer of an electronic device based on a training sequence transmitted from an external device to said electronic device so as to obtain a first parameter by which said equalizer compensates said training sequence, wherein said first parameter is associated with a difference between high-frequency and low-frequency energies of said training sequence;
   comparing said first parameter with a set of reference values so as to obtain a second parameter associated with a difference between high-frequency and low-frequency energies of an output data signal; and
   performing a pre-emphasis procedure to adjust a transmit unit of said electronic device so as to generate said output data signal, to be transmitted from said transmit unit to said external device, based on said second parameter.

2. The method of claim 1, wherein said training said equalizer comprises determining whether said training sequence at an output of said equalizer has its high-frequency energy substantially equal to its low frequency energy in a unit of a fixed time period.

3. The method of claim 2, wherein said unit of said fixed time period is greater than or substantially equal to a time period of a packet of said training sequence.

4. The method of claim 1, wherein said training sequence is transmitted from said external device to said electronic device through a cable connecting said external device and said electronic device.

5. The method of claim 1, wherein said electronic device comprises a universal serial bus (USB) interface for receiving said training sequence and transmitting said output data signal.

6. The method of claim 1, wherein said set of reference values comprise a set of energy differences.

7. The method of claim 1, wherein said training sequence comprises multiple packets having the same components and the same transmission periods.

8. The method of claim 1, wherein said training said equalizer comprises adjusting a gain for said training sequence by an automatic gain control (AGC) unit of said electronic device and compensating said training sequence at an output of said automatic gain control unit by said equalizer.

9. The method of claim 1 further comprising said comparing said first parameter with said set of reference values so as to obtain a third parameter; and performing said pre-emphasis procedure to adjust said transmit unit of said electronic device to generate said output data signal to be transmitted from said transmit unit to said external device based on said third parameter associated with a voltage swing of said output data signal.

10. The method of claim 1, wherein said training said equalizer comprises:
    amplifying said training sequence by a first gain value into a gained signal, wherein said gained signal has a first maximum voltage swing to be beyond a reference range of two voltage values in a first unit of a fixed time period;
    lowering said first gain value to a second gain value level by level until said gained signal has a second maximum voltage swing to be within said reference range of said two voltage values in a second unit of said fixed time period;
    after said lowering said first gain value to said second gain value, compensating said gained signal by a first compensation value into an equalized signal, wherein said equalized signal has a third maximum voltage swing to be beyond said reference range of said two voltage values in a third unit of said fixed time period; and
    adjusting said first compensation value to a second compensation value until said equalized signal has a fourth maximum voltage swing to be within said reference range of said two voltage values in a fourth unit of said fixed time period.

11. The method of claim 10, wherein said two voltage values comprise two respective voltages for linear operation for said electronic device.

12. The method of claim 10, wherein each of said first, second, third and fourth units is greater than or substantially equal to a time period of a packet of said training sequence.

13. The method of claim 10, wherein said first and second maximum voltage swings are at a low-frequency portion of said gained signal, wherein said third and fourth maximum voltage swings are at a high-frequency portion of said equalized signal.

14. The method of claim 1, wherein said training said equalizer comprises:
    adjusting said training sequence by a first gain value into a gained signal, wherein said gained signal has a first maximum voltage swing to be within a reference range of two voltage values in a first unit of a fixed time period;
    raising said first gain value to a second gain value level by level until said gained signal has a second maximum voltage swing to be beyond said reference range of said two voltage values in a second unit of said fixed time period;
    lowering said second gain value by one level so as to have said gained signal with a third maximum voltage swing to be within said reference range of said two voltage values in a third unit of said fixed time period;
    after said lowering said second gain value by one level, compensating said gained signal by a first compensation value into an equalized signal, wherein said equalized signal has a fourth maximum voltage swing to be beyond said reference range of said two voltage values in a fourth unit of said fixed time period; and
    adjusting said first compensation value to a second compensation value until said equalized signal has a fifth maximum voltage swing to be within said reference range of said two voltage values in a fifth unit of said fixed time period.

15. The method of claim 14, wherein each of said first, second, third, fourth and fifth units is greater than or substantially equal to a time period of a packet of said training sequence.

16. The method of claim 14, wherein said first, second and third maximum voltage swings are at a low-frequency portion of said gained signal, wherein said fourth and fifth maximum voltage swings are at a high-frequency portion of said equalized signal.

17. A method for training an equalizer, comprising:
    amplifying a training sequence by a first gain value into a gained signal, wherein said gained signal has a first maximum voltage swing to be beyond a reference range of two voltage values in a first unit of a fixed time period;
    lowering said first gain value to a second gain value level by level until said gained signal has a second maximum voltage swing to be within said reference range of said two voltage values in a second unit of said fixed time period;

after said lowering said first gain value to said second gain value, compensating said gained signal by a first compensation value into an equalized signal, wherein said equalized signal has a third maximum voltage swing to be beyond said reference range of said two voltage values in a third unit of said fixed time period; and adjusting said first compensation value to a second compensation value until said equalized signal has a fourth maximum voltage swing to be within said reference range of said two voltage values in a fourth unit of said fixed time period.

18. The method of claim 17, wherein said two voltage values comprise two respective voltages for linear operation for said electronic device.

19. A method for training an equalizer, comprising:

adjusting a training sequence by a first gain value into a gained signal, wherein said gained signal has a first maximum voltage swing to be within a reference range of two voltage values in a first unit of a fixed time period;

raising said first gain value to a second gain value level by level until said gained signal has a second maximum voltage swing to be beyond said reference range of said two voltage values in a second unit of said fixed time period;

lowering said second gain value by one level so as to have said gained signal with a third maximum voltage swing to be within said reference range of said two voltage values in a third unit of said fixed time period;

after said lowering said second gain value by one level, compensating said gained signal by a first compensation value into an equalized signal, wherein said equalized signal has a fourth maximum voltage swing to be beyond said reference range of said two voltage values in a fourth unit of said fixed time period; and adjusting said first compensation value to a second compensation value until said equalized signal has a fifth maximum voltage swing to be within said reference range of said two voltage values in a fifth unit of said fixed time period.

20. The method of claim 19, wherein each of said first, second, third, fourth and fifth units is greater than or substantially equal to a time period of a packet of said training sequence.

* * * * *